(12) United States Patent
Kopanski et al.

(10) Patent No.: US 10,562,619 B2
(45) Date of Patent: Feb. 18, 2020

(54) MAIN ROTOR TRIM TAB RETENTION SYSTEM, AN AIRCRAFT EMPLOYING SAME AND A METHOD OF REPLACING A TRIM TAB ASSEMBLY FROM BLADE HOUSING

(71) Applicant: Sikorsky Aircraft Corporation, Stratford, CT (US)

(72) Inventors: Krzysztof Kopanski, Trumbull, CT (US); Frank Caputo, Cheshire, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 215 days.

(21) Appl. No.: 15/533,521

(22) PCT Filed: Nov. 6, 2015

(86) PCT No.: PCT/US2015/059370
§ 371 (c)(1),
(2) Date: Jun. 6, 2017

(87) PCT Pub. No.: WO2016/111741
PCT Pub. Date: Jul. 14, 2016

(65) Prior Publication Data
US 2017/0341744 A1 Nov. 30, 2017

Related U.S. Application Data

(60) Provisional application No. 62/100,708, filed on Jan. 7, 2015.

(51) Int. Cl.
*B64C 27/615* (2006.01)
*B64C 27/72* (2006.01)
(Continued)

(52) U.S. Cl.
CPC ............ *B64C 27/615* (2013.01); *B64C 13/28* (2013.01); *B64C 27/473* (2013.01); *B64C 27/72* (2013.01);
(Continued)

(58) Field of Classification Search
CPC ..... F01D 5/188; B64C 27/615; B64C 27/473; B64C 27/008; B64C 2027/7261;
(Continued)

(56) References Cited

U.S. PATENT DOCUMENTS 2,906,569 A * 9/1959 Runton ................... B64C 13/02
29/898.047
4,213,587 A * 7/1980 Roeseler ................. B64C 9/16
244/213

(Continued)

FOREIGN PATENT DOCUMENTS

FR 1392727 3/1965

OTHER PUBLICATIONS

Notification of Transmittal of the International Search Report for International Application No. PCT/US2015/059370; International Filing Date: Nov. 6, 2015; dated May 20, 2016; 9 pages.
Written Opinion of the International Searching Authority for International Application No. PCT/US2015/059370; International Filing Date: Nov. 6, 2015; dated May 20, 2016; 5 pages.

*Primary Examiner* — Justin D Seabe
*Assistant Examiner* — Joshua R Beebe
(74) *Attorney, Agent, or Firm* — Cantor Colburn LLP

(57) ABSTRACT

A main rotor trim tab retention system includes, a blade housing having flanges separated by a cavity defined between the flanges, and a trim tab assembly. The trim tab assembly includes, a trim tab having an aerodynamic surface, at least one arm extending from the trim tab positionable within the cavity while the trim tab extends outward from the cavity, and a spherical bearing connecting the trim tab and the at least one arm, the spherical bearing having a
(Continued)

first axis which is substantially perpendicular to the aerodynamic surface of the trim tab. The at least one arm is pivotable about the spherical bearing about a second axis substantially perpendicular to the first axis to rotate the trim tab relative to the blade housing.

14 Claims, 3 Drawing Sheets

(51) Int. Cl.
    *B64C 13/28*     (2006.01)
    *B64C 27/473*     (2006.01)
    *B64C 27/00*     (2006.01)

(52) U.S. Cl.
    CPC .... *B64C 27/001* (2013.01); *B64C 2027/7266* (2013.01)

(58) Field of Classification Search
    CPC .... B64C 2027/7205; B64C 2027/7294; B64C 2027/7266; B64C 2027/7272; B64C 29/005; B64C 29/02; B64C 9/16; B64C 9/18; B64C 9/30; B63H 20/08; Y02T 50/34
    See application file for complete search history.

(56) References Cited

U.S. PATENT DOCUMENTS

| | | | |
|---|---|---|---|
| 4,470,366 A * | 9/1984 | Williams | B63B 1/248 |
| | | | 114/280 |
| 4,789,305 A | 12/1988 | Vaughen | |
| 6,109,870 A * | 8/2000 | Yamakawa | B64C 27/001 |
| | | | 244/17.25 |
| 6,453,669 B2 | 9/2002 | Kennedy et al. | |
| 7,578,654 B2 * | 8/2009 | Lorin De La Grandmaison | |
| | | | B64C 27/615 |
| | | | 416/23 |
| 7,594,796 B2 * | 9/2009 | De La Grandmaison | |
| | | | B64C 27/615 |
| | | | 416/24 |
| 7,762,770 B2 | 7/2010 | Sun et al. | |
| 8,727,722 B2 | 5/2014 | Houser et al. | |
| 9,415,868 B2 * | 8/2016 | Pfaller | B64C 27/615 |
| 2002/0071767 A1 | 6/2002 | Bauer et al. | |
| 2007/0252040 A1 * | 11/2007 | Kordel | B64C 7/00 |
| | | | 244/123.1 |
| 2014/0064962 A1 * | 3/2014 | Brewer | B64C 27/72 |
| | | | 416/1 |

\* cited by examiner

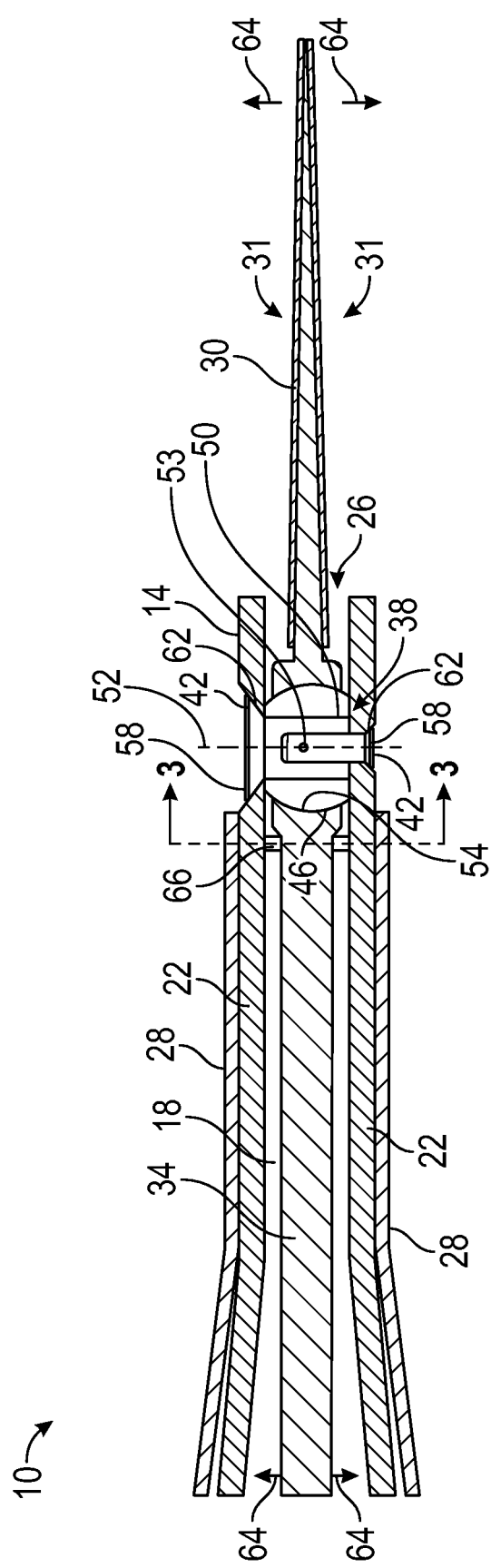
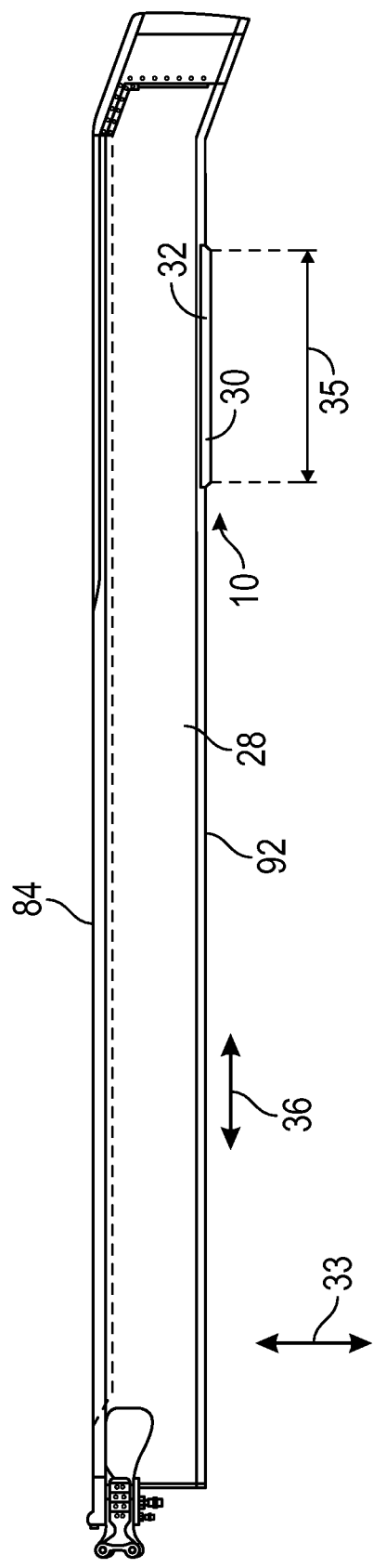

MAIN ROTOR TRIM TAB RETENTION SYSTEM, AN AIRCRAFT EMPLOYING SAME AND A METHOD OF REPLACING A TRIM TAB ASSEMBLY FROM BLADE HOUSING

CROSS REFERENCE TO RELATED APPLICATIONS

This application is a National Stage application of PCT/US2015/059370, filed Nov. 6, 2015, which claims the benefit of U.S. Provisional Application No.: 62/100,708, filed Jan. 7, 2015, both of which are incorporated by reference in their entirety herein.

STATEMENT REGARDING FEDERALLY SPONSORED RESEARCH OR DEVELOPMENT

This invention was made with Government support under Contract No. W911W6-13-2-0006 awarded by the United States Army. The Government has certain rights in the invention.

BACKGROUND OF THE INVENTION

Embodiments herein generally relate to aircrafts and, more particularly, to a trim tab retention system in the main rotors of the aircraft.

Helicopter main rotor blades typically have a trim tab at the trailing edge of the blades. The trim tabs are often made of aluminum sheet and are permanently bonded to the trailing edge of the blade. The trim tabs are permanently bent as part of the track and balance procedures of the aircraft. The trim tab on each of the blades is typically bent differently from the other trim tabs to minimize blade to blade differences in order to minimize vibrations induced by dissimilarity of the blades. Active trim tabs that adjust automatically in flight may not require permanent bending. Adjustable trim tabs may need to be replaced from time to time. Systems and methods to facilitate such replacement will be well received in the art.

BRIEF DESCRIPTION OF THE INVENTION

Disclosed herein is a main rotor trim tab retention system. The system includes, a blade housing having flanges separated by a cavity defined between the flanges, and a trim tab assembly. The trim tab assembly includes, a trim tab having an aerodynamic surface, at least one arm extending from the trim tab positionable within the cavity while the trim tab extends outward from the cavity, and a spherical bearing connecting the trim tab and the at least one arm, the spherical bearing having a first axis which is substantially perpendicular to the aerodynamic surface of the trim tab. The at least one arm is pivotable about the spherical bearing about a second axis substantially perpendicular to the first axis to rotate the trim tab relative to the blade housing.

In addition to one or more of the features described above, or as an alternative, further embodiments include; at least one fastener that extends through at least one of the flanges and the spherical bearing to retain the trim tab assembly to the blade housing, wherein the trim tab assembly is removable from the blade housing when the at least one fastener is removed; wherein the at least one arm comprises two arms; wherein the at least one fastener is in double shear; wherein the at least one fastener extends orthogonally through openings in the flanges; wherein the at least one arm is rigidly attached to the trim tab through the spherical bearing; wherein the at least one arm has a pivotal range of movement of about plus or minus 5 degrees; wherein the at least one arm has a pivotal range of movement of about plus or minus 3 degrees; and a seal which seals the cavity during movement of the trim tab relative to the blade housing; and an aircraft includes, a fuselage and an engine in operable communication with the fuselage and a rotor system in operable communication with the engine having at least one main rotor including a trim tab retention system disclosed above.

A method of replacing a trim tab assembly from a blade housing, includes, removing at least one fastener extending at least partially through two flanges of the blade housing and at least one bearing in a first trim tab assembly, removing at least one arm of the first trim tab assembly from a cavity of the blade housing defined between the two flanges, inserting at least one arm of a second trim tab assembly into the cavity, and inserting at least one fastener at least partially through the two flanges and through at least one bearing in the second trim tab assembly.

In addition to one or more of the features described above, or as an alternative, further embodiments include, removing the at least one fastener from a spherical bearing in the trim tab assembly; compressing a seal between the second trim tab assembly and the blade housing while inserting the at least one fastener; and sealing the trim tab assembly to the blade housing with the seal.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 1 depicts a partial cross sectional view of a main rotor trim tab retention system disclosed herein;

FIG. 2A depicts a top view of a blade that includes the main rotor trim tab retention system of FIG. 1;

DETAILED DESCRIPTION OF THE INVENTION

Figure 2B:
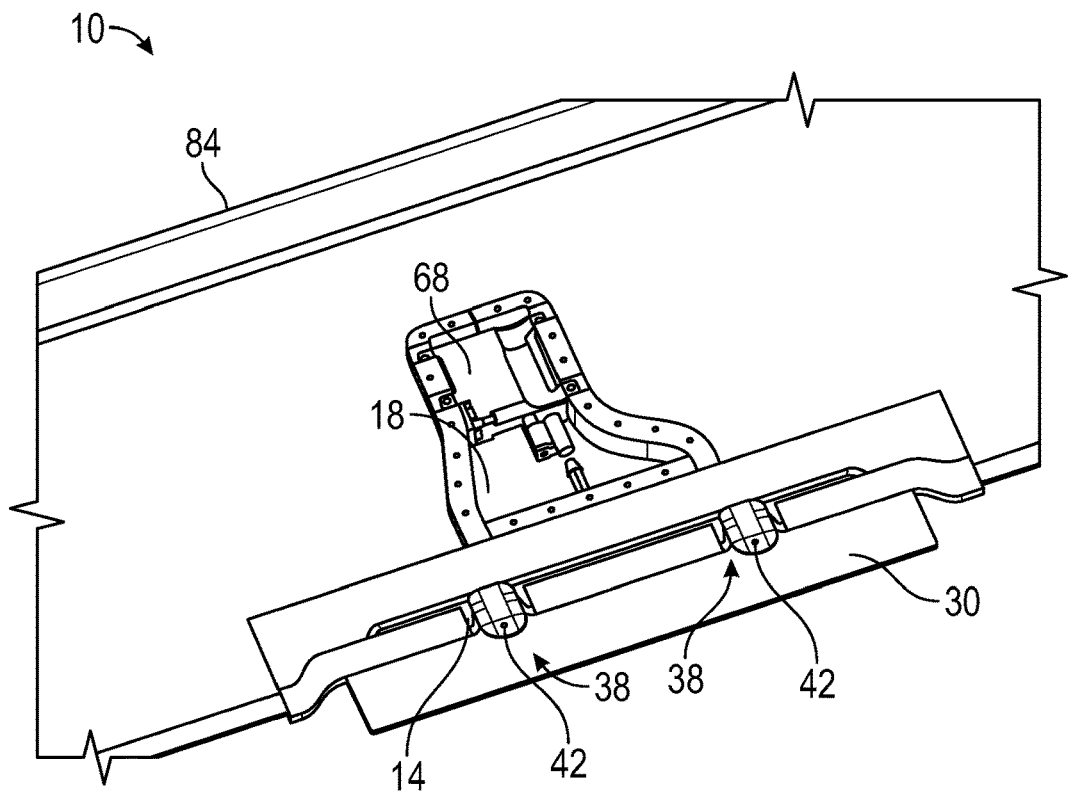
FIG. 2B depicts a perspective view of a portion of the blade of FIG. 2A that includes the main rotor trim tab retention system of FIG. 1.
Figure 2C:
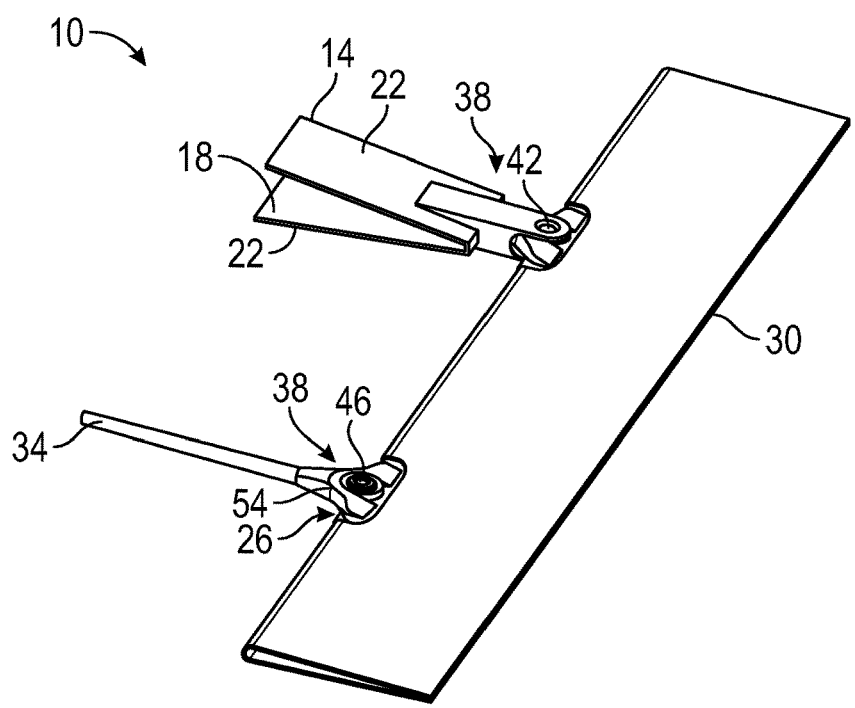
FIG. 2C depicts an alternate perspective view of the main rotor trim tab retention system if FIG. 1 with a portion of a blade removed.

Referring to FIGS. 1 through 2C, an embodiment of a main rotor trim tab retention system 10 includes a blade housing 14 and a trim tab assembly 26. The blade housing 14 includes a cavity 18 defined between flanges 22 of the blade housing 14. The flanges 22 are attached to aerodynamic surfaces 28 of a blade 84. The attachment can be via welding, adhesive, fasteners, or combinations of the foregoing, for example. The trim tab assembly 26 includes, a trim tab 30, at least one arm 34 extending from the trim tab 30 (with just one of the arms 34 being shown in FIG. 1) being positionable within the cavity 18 while the trim tab 30 extends outward from the cavity 18. A spherical bearing 38 is located intermediate the trim tab 30 and the arm 34 and thereby connects the trim tab 30 and the arm 34. The bearing 38 is receptive to at least one fastener 42, with two of the fasteners 42 being shown in the embodiment of the Figures extending through the flanges 22 and the bearing 38 to retain the trim tab assembly 26 to the blade housing 14.

A portion 32 of the trim tab 30 with at least one aerodynamic surface 31 extends in a chordwise direction 33 from the aerodynamic surfaces 28 and extends over a dimension 35 in the spanwise direction 36 as best shown in FIG. 2A. The bearing 38 of the illustrated embodiment is a spherical bearing that includes a sphere 46 with a hole 50 aligned along a first axis 52 therethrough and a socket 54 within which the sphere 46 is positioned. The fasteners 42 in this embodiment have chamfered heads 58 that are counter sunk within openings 62 in the flanges 22. The fasteners 42 are threadably engaged to one another within the hole 50 to retain the sphere 46 in a fixed position between the flanges 22 while permitting the socket 54 to rotate relative to the sphere 46 about a second axis 53. The second axis 53 is substantially perpendicular to the first axis 52 and extends in the spanwise direction 36. The holes 50 and the fasteners 42 installed therein are oriented substantially perpendicular to the aerodynamic surfaces 31 of the trim tab 30 and as such are generally in alignment with a rotational axis 51 (FIG. 4) of the blades 84 (shown vertically in the Figure) that is substantially parallel with the first axis 52. The trim tab 30 and the arm 34 are rigidly attached to the socket 54 thereby allowing the trim tab 30, the arm 34, and the socket 54 to pivotally rotate relative to the sphere 46 and the blade housing 18 in directions shown by arrows 64. While not required in all aspects, the tab retention system 10 can include an actuator 68 to create the movement 64 mechanically and/or electro-mechanically, or the movement 64 can be accomplished manually. The movement 64 can encompass a range of +/31 5 degrees, although a range of +/−3 degrees may be sufficient in some applications.

Trim tabs of conventional systems are typically made of metal that is plastically deformable. In such systems the tabs could be manually deformed (bent) to the desired level. In systems employing the actuators 68 the trim tabs 30 need not be plastically deformable since the adjustment can be made via the actuators 68 and not via deformation of the trim tabs 30 themselves. The trim tabs 30 can be made of materials such as polymers and composites such as carbon fiber composites, epoxy composites, and fiberglass in applications that do not need the trim tabs 30 to be permanently deformed. While the trim tabs 30 can still be made of materials that do permanently deform, such as metal for example, it is not a requirement. Composites may allow for construction of the trim tabs 30 that are less massive than their metal counterparts. The openings 62 are aligned substantially orthogonal to the aerodynamic surfaces 28 near where the cavity 18 exits the blade housing 14 thereby putting the fasteners 42 in double shear. The foregoing structure allows for replacement of a first of the trim tab assemblies 26 from the blade housing 14. Such replacement includes removing the fastener 42 that extends at least partially through the flanges 22 of the blade housing 14 and the bearing 38 in a first of the trim tab assemblies 26. Removing the arm 34 of the first trim tab assembly 26 from the cavity 18, inserting the arm 34 of a second of the trim tab assemblies 26 into the cavity 18, and inserting another of the fasteners 42 at least partially through the two flanges 22 and through the bearing 38 in the second trim tab assembly 26.

Figure 3:
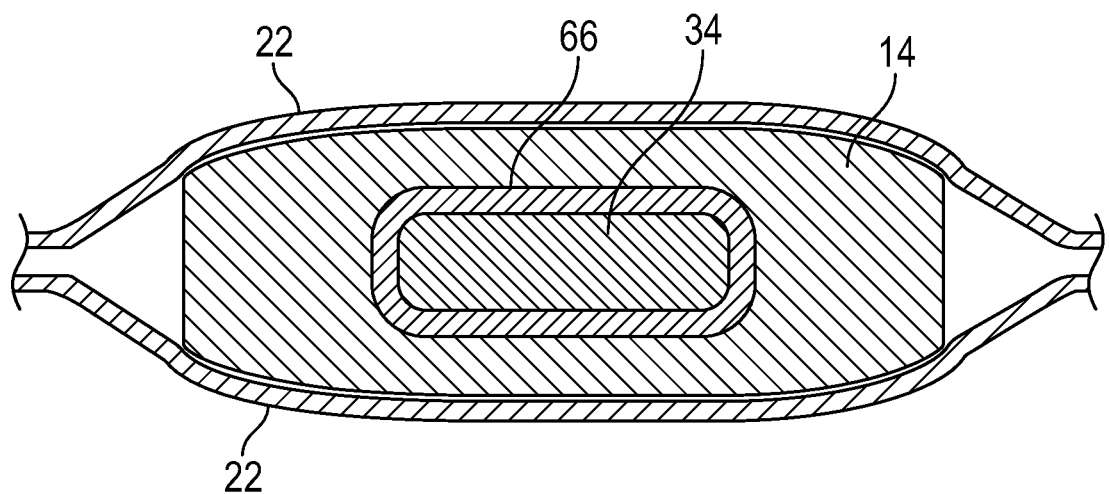
FIG. 3 depicts a partial cross sectional view of the main rotor trim tab retention system of FIG. 1 taken at arrows 3-3.

Referring to FIG. 3, a sectioned view of the embodiment of FIG. 1 taken at arrows 3-3 shows a seal 66 that sealingly engages to both the arm 34 and the blade housing 14. This sealing prevents atmospheric conditions from entering into the cavity 18 (best seen in FIG. 1). The seal 66 is compressed between the arm 34 and the blade housing 14. It should be evident that the amount of compression in the seal 66 varies as the arm 34 is rotated in the directions of arrows 64 (FIG. 1 only). In order to maintain sealing integrity the seal 66 may be made of a highly compressible material such as closed cell polymeric foam, for example. By design the seal 66 remains compressed at all possible positions of the arm 34 relative to the blade housing 14.

Figure 4:
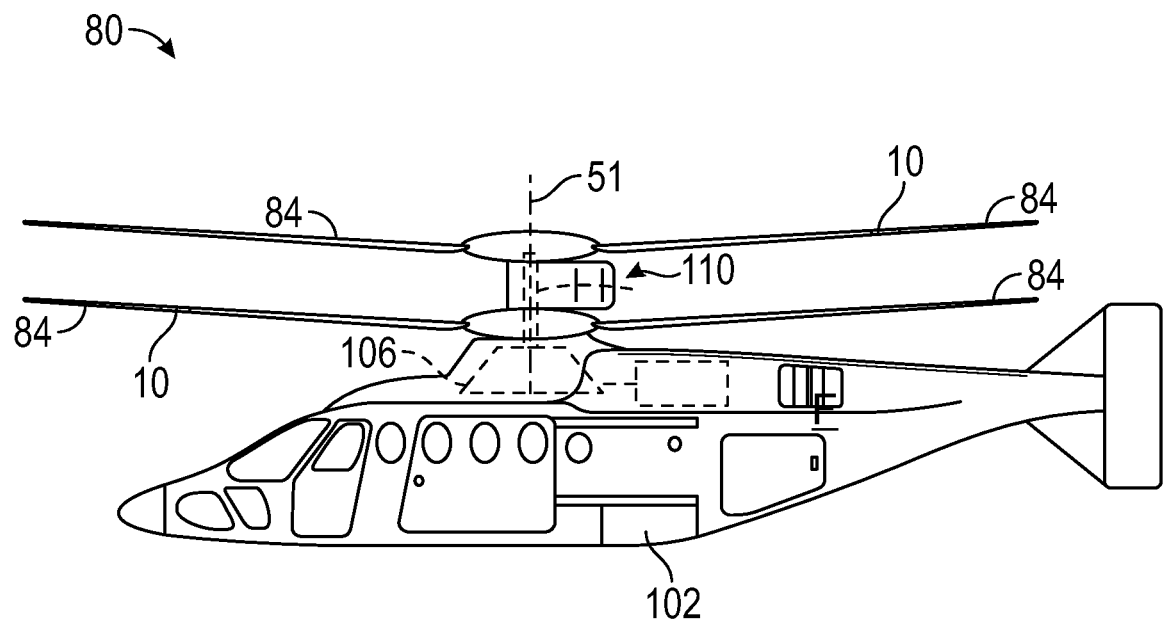
FIG. 4 depicts an aircraft employing the main rotor trim tab retention system of FIG. 1.

Referring to FIG. 4, an embodiment of an aircraft 80 employing the trim tab retention system 10 is illustrated. The aircraft 80 includes a fuselage 102 housing an engine 106. A rotor assembly 110 includes a plurality of main rotor blades 84 that are rotationally controlled by the engine 106 to rotate about the axis 51 that is substantially vertical in the Figure. Each of the blades 84 includes at least one of the trim tab retention systems 10 disposed on a trailing edge 92 (FIG. 2A) thereof. Although the aircraft 80 of the embodiment shown is a helicopter having two sets of the blades 84 it should be understood that alternate embodiments of the aircraft 80 are contemplated that have other numbers of the blades 84 as well as fixed wing aircraft. Additionally, the trim tab retention system 10 disclosed herein can also be used in other industries including maritime applications, wind turbine applications, and other applications where trim tabs are used or are usable.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. By way of example, while shown in the context of a coaxial helicopter, it is understood that aspects of the invention can be used for tabs and wings for other types of fixed and rotary wing aircraft, and can also be used in other industries including maritime applications, wind turbine applications, and other applications where trim tabs are used or usable. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A main rotor trim tab retention system, comprising:
a blade housing having a first flange and a second flange separated by a cavity defined between the first and second flanges; and a trim tab assembly comprising:
a trim tab partially disposed within the cavity having an aerodynamic surface outside of the cavity;
at least one arm extending from the trim tab being positionable within the cavity while the trim tab extends outward from the cavity; and
a spherical bearing attached within the cavity between the first and second flanges and connecting the trim tab and the at least one arm, the spherical bearing having a first axis which is substantially perpendicular to the aerodynamic surface of the trim tab, the at least one arm being pivotable about the spherical bearing about a second axis substantially perpendicular to the first axis to rotate the trim tab relative to the blade housing.

2. The main rotor trim tab retention system of claim 1, further comprising at least one fastener that extends through at least one of the flanges and the spherical bearing to retain the trim tab assembly to the blade housing, wherein the trim tab assembly is removable from the blade housing when the at least one fastener is removed.

3. The main rotor trim tab retention system of claim 2, wherein the at least one fastener is in double shear.

4. The main rotor trim tab retention system of claims 2, wherein the at least one fastener extends orthogonally through openings in the flanges.

5. The main rotor trim tab retention system of claim 1, wherein the at least one arm comprises two arms.

6. The main rotor trim tab retention system of claim 1, wherein the at least one arm is rigidly attached to the trim tab through the spherical bearing.

7. The main rotor trim tab retention system of claim 1, wherein the at least one arm has a pivotal range of movement of about plus or minus 5 degrees.

8. The main rotor trim tab retention system of claim 1, wherein the at least one arm has a pivotal range of movement of about plus or minus 3 degrees.

9. The main rotor trim tab retention system of claim 1, further comprising a seal which seals the cavity during movement of the trim tab relative to the blade housing.

10. An aircraft comprising:
a fuselage;
an engine in operable communication with the fuselage; and
a rotor system in operable communication with the engine having at least one main rotor comprising a trim tab retention system of claim 1.

11. A method of replacing a trim tab assembly from a blade housing, comprising: removing at least one fastener extending at least partially through two flanges of the blade housing and at least one bearing in a first trim tab assembly;
removing at least one arm of the first trim tab assembly from a cavity of the blade housing defined between the two flanges;
inserting at least one arm of a second trim tab assembly into the cavity; and inserting at least one fastener at least partially through the two flanges and through at least one bearing in the second trim tab assembly, wherein the at least one arm of the second tab assembly is inserted such that a trim tab of the second trim tab assembly is partially disposed within the cavity.

12. The method of replacing a trim tab assembly from a blade housing of claim 11, further comprising removing the at least one fastener from a spherical bearing in the trim tab assembly.

13. The method of replacing a trim tab assembly from a blade housing of claim 11, further comprising compressing a seal between the second trim tab assembly and the blade housing while inserting the at least one fastener.

14. The method of replacing a trim tab assembly from a blade housing of claim 13, further comprising sealing the trim tab assembly to the blade housing with the seal.

* * * * *